Figure 1:
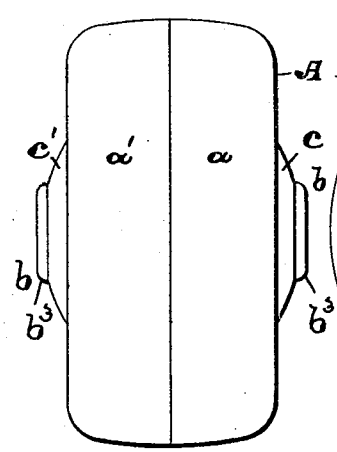

No. 669,122. Patented Mar. 5, 1901.
G. E. NEUBERTH.
WHEEL FOR CASTERS, &c.
(Application filed Sept. 22, 1900.)
(No Model.)

WITNESSES:
Geo. D. Richards

INVENTOR:
GEORGE E. NEUBERTH
BY
Fred H. Fraentzel.
ATTORNEY

THE NORRIS PETERS CO., PHOTO-LITHO., WASHINGTON, D. C.

UNITED STATES PATENT OFFICE.

GEORGE E. NEUBERTH, OF NEWARK, NEW JERSEY, ASSIGNOR TO HENRY ILL, OF SAME PLACE.

WHEEL FOR CASTERS, &c.

SPECIFICATION forming part of Letters Patent No. 669,122, dated March 5, 1901.

Application filed September 22, 1900. Serial No. 30,869. (No model.)

*To all whom it may concern:*

Be it known that I, GEORGE E. NEUBERTH, a citizen of the United States, residing at Newark, in the county of Essex and State of New Jersey, have invented certain new and useful Improvements in Wheels or Rollers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention has reference to improvements in the construction of hollow sheet-metal wheels or rollers which may be put to various uses, but which are more especially adapted for use as casters for furniture and the like; and my invention has reference more particularly to that class of hollow wheels or rollers which are made in separate sections or halves stamped or struck up from sheet metal and then operatively secured together by pressure in suitable dies or machinery to provide a wheel or roller of this character, the parts of which are rigidly secured together without any employment of solder or other fastening means except the holding or retaining beads of the central tubular spindle of the wheel or roller.

The principal object of this invention, therefore, is to provide a wheel or roller comprising a pair of half-sections and a novel means of securing them together with a view of constructing a wheel or roller of fewer parts than heretofore and without the expensive operation of first finishing or grinding off the annular abutting edges of the half-sections at the joint where these edges of the half-sections come together when the parts are assembled.

A further object of this invention is to provide a novel construction of caster or other wheel or roller comprising a pair of sections to be secured together by means of pressure, and to provide a simply-constructed and strong roller or wheel, the half-sections having abutting enlargements which are made to abut or come together and are concentric with the central tubular spindle of the wheel or roller, thereby producing great stability of the parts and increased strength.

The invention therefore consists in the novel construction of roller or wheel for the purposes hereinabove set forth, and, furthermore, the invention consists in such novel arrangements and combinations of the various parts thereof, all of which will be hereinafter fully described, and finally embodied in the clauses of the claim, which form a part of this specification.

The invention is clearly illustrated in the accompanying drawings, in which—

Figure 2:
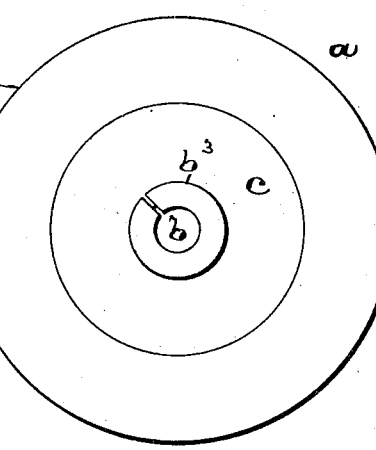
Figure 3:
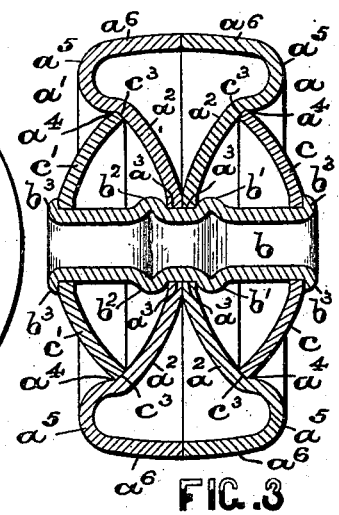
Figures 4, 5:
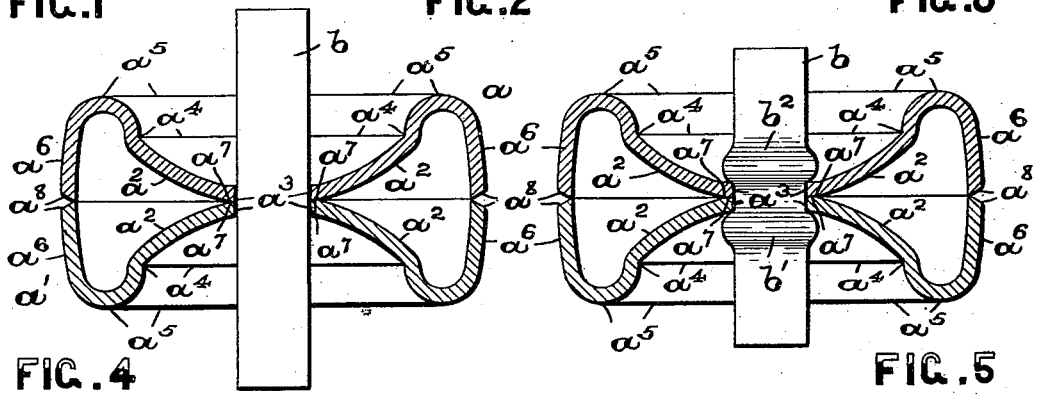
Figure 6:
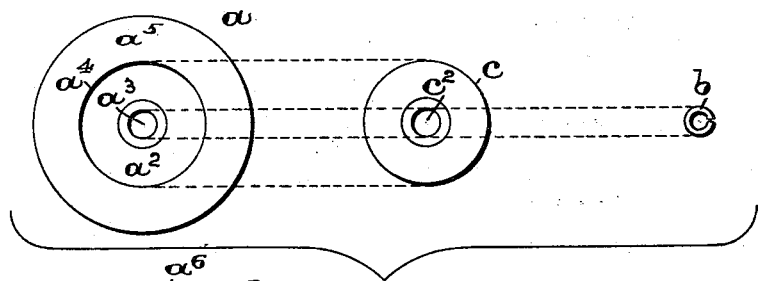
Figure 7:
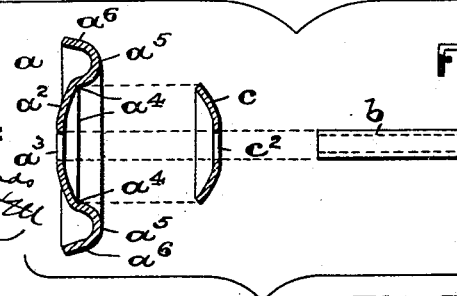

Figures 1 and 2 are a side and face view, respectively, of a wheel or roller made according to the principles of this invention; and Fig. 3 is a vertical cross-section of the same, illustrating the general arrangement of the several parts of the wheel or roller in their locked positions. Figs. 4 and 5 are similar views of the several parts of the wheel or roller before rigidly secured on the central spindle of the device by means of a pair of oppositely-arranged cup-shaped disks or washers, said two views representing the successive steps of assembling the parts and securing them in position upon the central spindle before such cup-shaped disks or washers are arranged upon the said spindle and then forced together by means of dies or machinery to produce the complete wheel or roller. Fig. 6 is a diagrammatic view of one of the main half-sections and one of the cup-shaped disks or washers, as well as the tubular spindle, before the parts are assembled; and Fig. 7 is a similar view of the same parts, the main half-section and the disk or washer being represented in cross-section and the spindle in side elevation.

Similar letters of reference are employed in all of the said above-described views to indicate corresponding parts.

In the said drawings, A indicates the complete wheel or roller, and $a$ and $a'$ are two sheet-metal sections or shells, each forming one-half of the wheel or roller and each being provided with a central hole or perforation $a^3$, whereby each section or shell $a$ and $a'$ can be arranged upon a tubular and central spindle $b$, with a pair of cup-shaped disks or washers $c$ and $c'$ on said spindle and upon the opposite sides of said sections or shells, all to be secured together by pressure in the manner hereinafter fully described to thereby produce the complete wheel or roller represented in Figs. 1 and 2 of the drawings. The said half-sections are each of them provided with a dish-shaped body portion $a^2$ and also provided with the annular shoulders $a^4$ and then formed with annular bead-like parts $a^5$, which terminate in the peripheral surfaces $a^6$. The said half-sections $a$ and $a'$ in the manufacture of the wheels or rollers are first arranged upon the cylindrical tubing $b$, with the portions $a^7$, which surround the central perforations or holes in the disk-shaped portions $a^2$, arranged side by side, so as to abut, and having the angular edges $a^8$, which are formed in this shape by the drawing of the metal in the die when pressing the half-sections into the desired shape, arranged as illustrated more particularly in Fig. 4 of the drawings. After having arranged the half-sections $a$ and $a'$ upon the tubular spindle $b$, as shown in Fig. 4, the said spindle $b$ is provided, by means of the proper tools, with the annular enlargements or beads $b'$ and $b^2$, arranged upon opposite sides of the abutting portions $a^7$ of the dish-shaped portions $a^2$ of the half-sections $a$ and $a'$, as clearly illustrated in Fig. 5. In this manner the two sections $a$ and $a'$ are suitably held upon the spindle $b$ for the placing of the cup-shaped disks or washers $c$ and $c'$ in position by means of central perforation or hole $c^2$ in each disk or washer upon the said spindle $b$. The said cup-shaped disks or washers $c$ and $c'$ are made of such size that their annular edges $c^3$ will fit in the annular shoulders $a^4$ of the respective half-sections $a$, and $a'$ and then by means of a die forcibly pressed into said annular shoulders $a^4$, when the central part of each disk or washer $c$ and $c'$ is forced along the cylindrical surface of the spindle $b$ and then rigidly secured in position by means of the beads or turned-over edges $b^3$, which are formed at the same time, by means of the die on the respective ends of the spindle $b$, substantially as illustrated in Fig. 3 of the drawings. At the same time of the upsetting of the two ends of the spindle $b$, whereby the retaining-beads $b^3$ are formed, the cup-shaped disks or washers $c$ and $c'$ will have their annular edges $c^3$ firmly pressing against the annular shoulders $a^4$ of the sections $a$ and $a'$, and thereby the peripheral portions $a^6$ will be brought closer together and the chamfered edges $a^8$ will close up tightly, in the manner indicated in Figs. 1 and 3, without barely showing the joint formed by the abutting edges, and this without having first finished off or ground down the angular or chamfered edges of the half-sections $a$ and $a'$ by means of special machinery, as is now ordinarily done.

By my novel method of assembling the parts in the manner hereinabove described a simple construction of wheel or roller is produced which is very strong and serviceable for carrying heavy loads, for the greater the pressure upon the peripherial surface of the wheel or roller the greater will be the force exerted by the cup-shaped disks or washers against the half-sections at their annular shoulders $a^4$, while the annular beads $b^3$ of the spindle $b$ will prevent any pulling apart of the two shells or sections $a$ and $a'$.

I am aware that some changes may be made in the several arrangements and combinations of the several parts herein described without departing from the scope of my present invention. Hence I do not limit my invention to the exact arrangements and combinations of the various parts as set forth in the accompanying specification and illustrated in the drawings thereof, nor do I confine myself to the exact details of the construction of the said parts.

Having thus described my invention, what I claim is—

1. A wheel or roller consisting, essentially, of a spindle, a pair of metal shells or sections on said spindle, provided with annular shoulders, and cup-shaped disks or washers on said spindle, having their annular edges arranged and forced beneath said shoulders and held in position by means of the said shoulders, and means for securing said sections and disks upon said spindle, substantially as and for the purposes set forth.

2. In a wheel or roller, the combination, with a central spindle, of a pair of wheel-sections on said spindle, said sections having dish-shaped portions, beads on said spindle arranged against the opposite sides of said dish-shaped portions, retaining disks or washers on said spindle and arranged against each side of the said dish-shaped portion of each section, and means for rigidly securing said sections and disks or washers on said spindle to produce the complete wheel or roller, substantially as and for the purposes set forth.

3. A wheel or roller consisting, essentially, of a tubular spindle, a pair of metal shells or sections on said spindle, provided with annular shoulders $a^4$, cup-shaped disks or washers on said spindle having their annular edges arranged in said annular shoulders, and means on said spindle for rigidly securing said sections and disks or washers on said spindle to produce the complete wheel or roller, substantially as and for the purposes set forth.

4. A wheel or roller consisting, essentially, of a tubular spindle, annular beads $b'$ and $b^2$ on said spindle, a pair of metal shells or sections on said spindle, provided with annular shoulders $a^4$, cup-shaped disks or washers on said spindle having their annular edges arranged in said annular shoulders, and means on said spindle for rigidly securing said sections and disks or washers on said spindle to produce the complete wheel or roller, substantially as and for the purposes set forth.

5. A wheel or roller consisting, essentially, of a tubular spindle, annular beads $b'$ and $b^2$ on said spindle, a pair of metal shells or sections on said spindle, provided with annular shoulders $a^4$, cup-shaped disks or washers on said spindle having their annular edges arranged in said annular shoulders, and beads $b^3$ at the free ends of said spindle turned over against the said disks or washers for securing said parts together and producing the complete wheel or roller, substantially as and for the purposes set forth.

In testimony that I claim the invention set forth above I have hereunto set my hand this 17th day of September, 1900.

GEORGE E. NEUBERTH.

Witnesses:
FREDK. C. FRAENTZEL,
GEO. D. RICHARDS.